Nov. 12, 1935.  C. G. BRIEL  2,020,820
METHOD OF PRODUCING COMPOSITE PICTURES
Filed Oct. 12, 1931   2 Sheets-Sheet 1
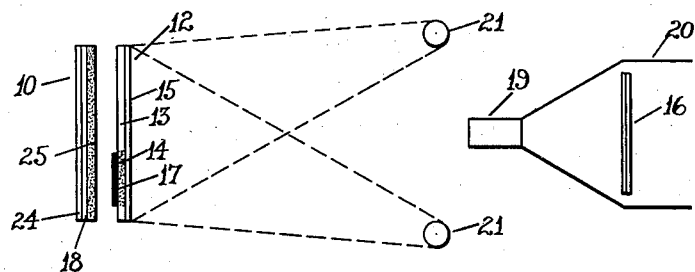
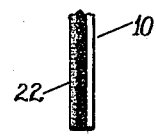
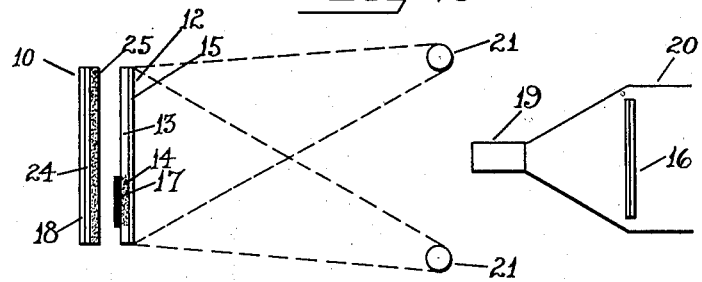
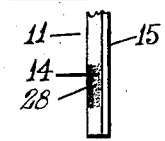
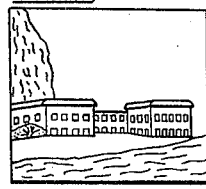
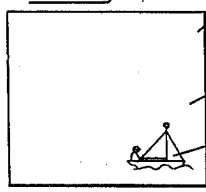
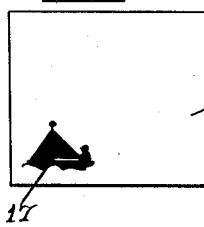
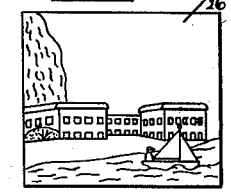
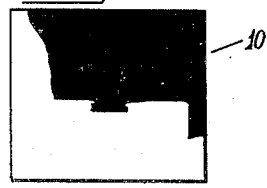
INVENTOR
Conrad G. Briel
Jones, Addington, Ames & Seibold
ATTORNEYS Nov. 12, 1935.  C. G. BRIEL  2,020,820
METHOD OF PRODUCING COMPOSITE PICTURES
Filed Oct. 12, 1931    2 Sheets-Sheet 2
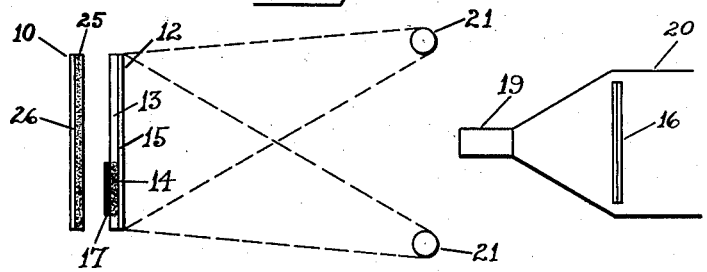
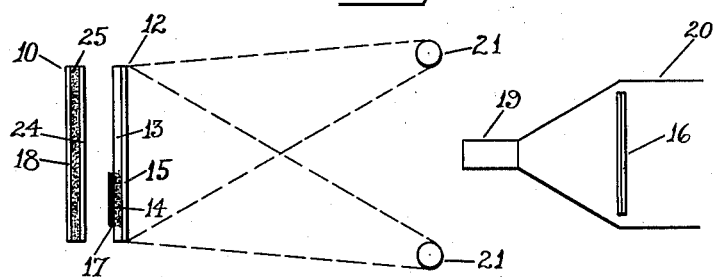
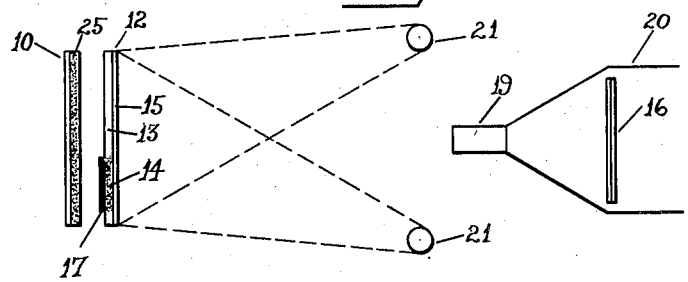
INVENTOR
Conrad G. Briel
ATTORNEYS Patented Nov. 12, 1935

2,020,820

UNITED STATES PATENT OFFICE 2,020,820

METHOD OF PRODUCING COMPOSITE PICTURES

Conrad G. Briel, Chicago, Ill., assignor to Cinema Development Company, Chicago, Ill., a corporation of Illinois Application October 12, 1931, Serial No. 568,386

3 Claims. (Cl. 88—16)

This invention relates to a method of producing composite pictures in photography.

More particularly, this invention relates to a method of producing composite photographs embodying two or more component parts, which includes placing the components in superposed relation and illuminating them with lights with which they are respectively illuminable, and, by a single exposure, producing a composite picture.

The desirability of producing composite photographs is particularly marked in the motion picture art, but the invention herein described is not limited to this art alone but may be used generally in photography.

Broadly, two or more original scenes or components may be composed into a single picture by the use of film transparencies, one comprising a selected background and the other comprising a selected action, which are superposed and photographed, and both components having their images rendered opaque to but reflective of light, the specific disclosure including treating the foreground image, as by bleaching, and applying an opaque coating thereover that may be non-actinic, and then applying a coating having both characteristics of light reflectivity and opacity to the background film, preferably over the entire film, so that when both components are superposed and illuminated by reflection, a composite photograph may be produced.

The present invention is an improvement upon the methods of producing composite pictures disclosed and claimed in my co-pending applications, Serial Number 568,384, filed October 12, 1931, and Serial Number 568,385, filed October 12, 1931, both being assigned to the present assignee.

In order to apprise those skilled in the art how to practice my invention, I shall now describe several preferred embodiments thereof in connection with the accompanying drawings which form a part hereof.

In the drawings:

Figure 1 illustrates one of the various ways of placing a foreground film adjacent to a background film, which films have been treated in accordance with the present invention, and controlling the illumination to permit photographing by a single exposure;

Fig. 2 is a similar illustration showing an alternative embodiment of the present invention;

Fig. 3 is a front elevation of a positive background scene, the film being that usually employed in photography;

Fig. 4 is a negative of the background scene shown in Fig. 1;

Fig. 5 is a positive image on a film to be used as a foreground, the image having been made reflective of light;

Fig. 6 is the same positive shown in Fig. 5 but looking at the opposite or emulsion side to show the opaque or non-actinic coating over the image;

Fig. 7 illustrates a finished composite picture carrying the images of the foreground and the background thereon as a complete picture;

Figs. 8, 9 and 10 illustrate additional alternative embodiments of the invention; and Figs. 11 and 12 illustrate variant ways of providing the desired backings to the foreground and background components.

The components used may be the usual black and white diapositives, such as the ordinary cinema projecting films, or plates used in still photography, or they may be paintings, depending upon the characters or images to be combined and the superimposing to be done.

When the extensively used present-day film is developed, the images are formed by the fixation of innumerable minute particles of metallic silver imbedded in the gelatin of the photographic emulsion, there being relatively more silver particles in the shadows than in the high-lights but somewhat uniformly distributed throughout the depth of the photographic emulsion.

The present invention is very well adapted to this type of photographic film, but it will be understood that the invention might well be applied to other film where the images are produced in a different manner or have different physical characteristics.

As shown in the drawings, the background may be scenery or other objects in the form of a painting or photographic film and may be produced by making a negative 10. Positive print 11 of negative 10 is shown in Fig. 3.

As a specific example, the foreground film 12 shown in Fig. 5 may be the usual diapositive, such as the ordinary cinema projecting film, having the area 13 about the image 14 transparent and the image 14 comprising metallic silver imbedded in the photographic emulsion carried by the base 15 of the film. The action or objects, of which the foreground image 14 is composed, may be photographed in front of a white ground, so that, when a positive print is made from the negative, the area 13 about the image will be transparent or relatively free from silver deposit.

While one of the features of the present invention resides in making the foreground image 14 itself reflective of light, it will be understood that the same results may be accomplished where image 14 is either inherently reflective of light, or has been otherwise previously treated to be reflective of light for any purpose whatsoever. This step may be accomplished by bleaching the silver image in any well known way so that the image will be changed into a light figure or into a substance which reflects light.

I do not wish to be limited to the particular way this step of the invention is accomplished, but suggest bleaching image 14 to a whiteness as one method of obtaining the desired results, the density of the whiteness varying according to the density of the metallic silver, with a corresponding variation of reflectivity for light to effect a correct reproduction of the image and its details when photographed upon positive film 16 in camera 20.

Bleaching a silver image on a film is a step well known in the art. As an example, I suggest the use of a re-agent, comprising mercuric chloride and potassium bromide, which changes the metallic silver into a complex silver mercury bromide. The density of the image may be somewhat built up in the bleaching action, but this is not necessary for the purpose of the present invention, because it may be said that it is quite desirable to control the intensification of the image and even restrict it as much as possible, so that the density and contrast of the image will remain quite uniform throughout the steps of the process. A relatively opaque or non-actinic coating 17 may then be applied to the image either manually, mechanically, chemically, optically, photographically or electrolytically.

Fig. 6 illustrates the bleached image after it has been coated by opaque substance 17, and is a view looking at the emulsion side of the foreground film 12 to show that this coating 17 may be applied to the image upon the emulsion side, although not necessarily so, inasmuch as it may be applied to the base side 15 when the occasion may require.

As an alternative method of producing an opaque or non-actinic effect in the image, I have found that after this image 14 is bleached, as shown in Fig. 5, the foreground film 12 may be dipped or passed through any well known developing solution so that the particles near the surface only comprising the complex silver mercury bromide of the bleached image will be darkened to form a backing, as indicated at 28 in Fig. 11, for the bleached image 14, which backing will be relatively opaque or non-actinic, and permit the remaining particles of silver mercury bromide of the bleached image 14 to reflect light.

Bleaching the image 14 of the foreground positive 12, as shown in Fig. 5, will preferably necessitate the use of a negative for the background when superposing in accordance with the arrangement shown in Figs. 1, 2, 8, 9 and 10. Bleaching the foreground image 14 causes, in effect, a change of the positive into a negative, so that it is desirable that the background component also be a negative. To this end, a coating 18, which is opaque to but reflective of light, is applied over the entire rear surface of background negative 10. By the term "rear surface" I mean the surface that is away from and not facing lens 19 of camera 20.

The next step in the method herein disclosed consists in placing the negative background film 10 and the positive foreground film 12, after both components have been treated, in superposed relation. As shown in the drawings, background negative 10 and foreground positive 12 need not be in actual contact, but may be arranged in suitable position and in one focal plane of lens 19 of camera 20, while unexposed film 16 may be arranged in the other focal plane of lens 19. By proper lighting effects, these films may be illuminated so that they may be photographed by camera 20, or otherwise exposed to film 16, and a composite picture produced upon film 16, which in this case will be a positive, as shown in Fig. 7.

The particular step of illuminating films 10 and 12 may be varied from that shown in the drawings, but, as illustrated, it is preferred to use a light or lights 21 to illuminate the background component 10 and the foreground component 12 by reflected light. The illuminating light or lights 21 may be placed in any suitable position to secure the desired results. It is possible to space the components a suitable distance apart and employ separate illuminators for illuminating the background component 10 and the foreground component 12. If an arrangement is used which is shown in the drawings, the rays of light from illuminators 21 will pass through the clear area 13 of foreground component 12, strike the image of background component 10, and be reflected back through this clear area 13 of film 12, except where foreground image 14 appears thereon, thereby effecting illumination of the background component by reflection. Coating or surface 17 serves to prevent the passage of reflected light from background film 10 through the foreground image area, while bleaching of the foreground image 14 presents the effect of reflecting the rays of light from illuminators 21 so that the details of the foreground image 14 will appear clear and distinct in the composite picture of film 16. Film 16, as shown in Fig. 7, illustrates a complete composite picture of the images shown in the background and the foreground films illustrated in the drawings.

The character of coating 17 required to accomplish the herein desired results need only be such as will be relatively opaque and non-actinic or absorptive of light rays. They may be of any color, although I desire that coating 17 be somewhat dark or have less actinic value than the foreground image 14. The character of coating 18 required to accomplish the herein desired results need only be such as will be opaque to but reflective of light, preferably being, however, of a light color. I have found that coating 18 may be obtained by dipping background negative 10 into a bleaching re-agent, which re-agent may be similar to that above described, if so desired, until the surface particles of the background negative image are bleached to a substantial whiteness, this step being controlled to the extent of restricting the bleaching action upon the surface particles to a depth sufficient to produce a backing 22 as shown in Fig. 12, similar to backing 18, having the necessary opacity and light reflectivity to show the details of the background upon the composite picture. The method of producing an opaque and light-reflective surface in this manner has been disclosed and claimed in my co-pending application Serial No. 532,840, filed April 25, 1931.

In instances where coating 18 is employed, this coating may be applied to background component 10 in a number of different ways, as illustrated in Figs. 1, 2, 8, 9 and 10.

In Fig. 1, coating 18 is arranged in optical contact with the background image and as a substratum over the entire film between the celluloid base 24 and the emulsion 25. Where the emulsion of the background film 10 and the foreground film 12 face each other, as shown in Fig. 2, coating 18 may be applied over the entire area of celluloid base 24 so that the background image 10 is spaced from this opaque but light-reflective coating 18 by the celluloid base 24.

It will be understood that although I have described the present invention in connection with the standard photographic film wherein the sensitive photographic material is carried upon a base such as celluloid, any type of film may be used and a celluloid base is not essential.

In Fig. 8, the emulsion is shown carried upon a white material 26. This material may be of any suitable substance, such as paper, and may serve the same purpose as coating 18.

In Fig. 9 there is shown an arrangement embodying the application of coating 18 to the emulsion 25 of background component 10 so that the celluloid base 24 is arranged to face the foreground component 12. Coating 18 may also be provided, as shown in Fig. 10, by not fixing film 10 after developing so as to allow the undeveloped sensitive photographic material to remain in the emulsion. The density of this undeveloped sensitive photographic material varies to produce a varying reflectivity for light, and, of course, opacity, to effect correct reproduction of the background image, when photographed upon film 16. In the event the ordinary photographic film is used where the images are formed by the fixation of innumerable minute particles of metallic silver imbedded in gelatin comprising a photographic emulsion, the undeveloped sensitive photographic material may comprise an undeveloped silver salt, such as possibly a silver bromide of yellowish appearance. If so desired, a suitable de-sensitizer may be used to prevent darkening of this silver bromide by the action of light.

In the drawings, the photographic emulsion is shown considerably thicker in cross-section than the celluloid base contrary to the actual proportions generally used in the ordinary photographic film; but it will be understood that this showing is made for the purpose of illustration only, that these proportions may vary, and that the proportions of the standard photographic film are also contemplated.

Other advantages and objects will be apparent to those skilled in the art, and therefore I do not wish to be limited to the exact details or steps described and shown herein, since many modifications are possible without departing from the spirit and scope of the invention.

I claim:

1. The method of producing a composite photograph embodying two or more component parts which includes making photographic images of both components, treating the image of one component to make it reflective of light, providing an opaque and non-actinic backing for such image, providing an opaque but light reflective backing for the image of the other component, superposing the two components and illuminating them by reflected light, and exposing a fresh actinic surface to the images so superposed and illuminated.

2. The method of producing a composite photograph embodying two or more component parts which includes making a photographic image of one component reflective of light, providing an opaque and non-actinic backing for said light reflective image, providing an opaque and light reflective backing for the photographic image of the other component, superposing the components and illuminating them by light with which they are respectively illuminable, and exposing a fresh actinic surface to the components so superposed and illuminated.

3. The method of producing a composite photograph embodying two component parts which includes making a photographic silver deposit image of one component, chemically transforming the silver deposit of said image and thereby producing an image substantially reflective of light, further treating said image to make it substantially opaque to transmitted light, providing an opaque but light reflective backing for the other component, superposing both components and illuminating them by reflected light, and exposing a fresh actinic surface to the components so superposed and illuminated.

CONRAD G. BRIEL.